United States Patent
Shahabi et al.

(10) Patent No.: US 8,635,228 B2
(45) Date of Patent: Jan. 21, 2014

(54) DYNAMICALLY LINKING RELEVANT DOCUMENTS TO REGIONS OF INTEREST

(75) Inventors: Cyrus Shahabi, Irvine, CA (US); Craig A. Knoblock, El Segundo, CA (US); Dipsy Kapoor, Redondo Beach, CA (US); Ching-Chien Chen, Temple City, CA (US)

(73) Assignee: Terrago Technologies, Inc., Atlanta, GA (US)

( * ) Notice: Subject to any disclaimer, the term of this patent is extended or adjusted under 35 U.S.C. 154(b) by 343 days.

(21) Appl. No.: 12/619,554

(22) Filed: Nov. 16, 2009

(65) Prior Publication Data

US 2011/0119265 A1      May 19, 2011

(51) Int. Cl.
  *G06F 7/00* (2006.01)
  *G06F 17/30* (2006.01)
(52) U.S. Cl.
  USPC .......................................... 707/748; 707/741
(58) Field of Classification Search
  None
  See application file for complete search history.

(56) References Cited

U.S. PATENT DOCUMENTS

| | | | |
|---|---|---|---|
| 4,891,761 A | 1/1990 | Gray et al. | |
| 5,546,107 A | 8/1996 | Deretsky et al. | |
| 6,597,818 B2 | 7/2003 | Kumar et al. | |
| 7,660,441 B2 | 2/2010 | Chen et al. | |
| 7,747,598 B2 * | 6/2010 | Buron et al. | 707/705 |
| 7,822,751 B2 * | 10/2010 | O'Clair et al. | 707/748 |
| 2001/0036302 A1 | 11/2001 | Miller | |
| 2001/0038718 A1 | 11/2001 | Kumar et al. | |
| 2003/0068071 A1 | 4/2003 | Wilson | |
| 2005/0065959 A1* | 3/2005 | Smith et al. | 707/102 |
| 2005/0100220 A1 | 5/2005 | Keaton et al. | |
| 2006/0101005 A1 | 5/2006 | Yang et al. | |
| 2007/0014488 A1 | 1/2007 | Chen et al. | |
| 2009/0089254 A1 | 4/2009 | Von Kaenel et al. | |
| 2009/0285487 A1 | 11/2009 | Knoblock et al. | |
| 2011/0007941 A1 | 1/2011 | Chen et al. | |
| 2011/0142347 A1 | 6/2011 | Chen et al. | |
| 2011/0280453 A1 | 11/2011 | Chen et al. | |

OTHER PUBLICATIONS

Bruno Martins et al "Indexing and Ranking in Geo-IR Systems", Proceedings of the 2005 workshop on Geographic information retrieval, pp. 31-34.*
Zhou, Y. et al, Hybrid index structures for location-based web search, CIKM, 2005, 8 pages.
Hariharan, R. et al, Processing Spatial-Keyword (SK) Queries in Geographic Information Retrieval (GIR) Systems, SSDBM, 2007, 10 pages.
De Felipe, I. et al, Keyword Search on Spatial Databases, ICDE, 2008, 10 pages.

(Continued)

*Primary Examiner* — Uyen Le

(57) ABSTRACT

Document relevance is determined with respect to a region of interest (ROI). A set of location references may be associated with a set of documents. The system selects location references associated with an ROI and then selects documents corresponding to the selected location references. The selected documents can be reported or processed further. A document-location reference index can be accessed when the present system is 'online' and processing a request for documents relevant to an ROI. The document-location reference index may be generated and updated while the present system is 'offline' and not processing a request for documents. The resulting relevant documents may be provided to a user in response to a document search associated with the ROI or along with an advertisement associated with the ROI.

23 Claims, 6 Drawing Sheets

(56) References Cited

OTHER PUBLICATIONS

Cong, G. et al, Efficient Retrieval of the Top-k Most Relevant Spatial Web Objects, VLDB 2009, 12 pages.
Zhang, D. et al, Keyword Search in Spatial Databases: Towards Searching by Document, ICDE, 2009, 12 pages.
Chen, Y. et al, Efficient query processing in geographic web search engines, SIDMOD, 2006. 12 pages.
Jones, C.B. et al, The SPIRIT Spatial Search Engine: Architecture, Ontologies and Spatial Indexing, GIS, 2004, 15 pages.
Gianinetto et al. "Fusion of Aerial and Satellite Imagery Over the City of Venezia." 2nd GRSS/ISPRS Joint Workshop on Remote Sensing and Data Fusion over Urban Areas, May 22-23, 2003, pp. 216-219.
Zhou, Y. et al, Hybrid index structures for location-based web search, CIKM, 2005, 8 pages.
Hariharan, R. et al, Processing Spatial-Keyword (SK) Queries in Geographic Information Retrieval (GIR) Systems, SSDBM, 2007, 10 pages.
De Felipe, I. et al, Keyword Search on Spatial Databases, ICDE, 2008, 10 pages.
Cong, G. et al, Efficient Retrieval of the Top-k Most Relevant Spatial Web Objects, VLDB 2009. 12 pages.
Chen, Y. et al, Efficient query processing in geographic web search engines, SIGMOD, 2006, 12 pages.
Jones, C. B. et al, The SPIRIT Spatial Search Engine: Architecture, Ontologies and Spatial Indexing, GIS, 2004, 15 pages.
Chen, et al. "Automatically annotating and integrating spatial datasets", Springer-Verlag Berlin Heidelberg, pp. 469-488, 2003.
Doytsher. "A rubber sheeting algorithm for non-rectangle maps", Computer & Geosciences, 26, 2000.
Final Office Action, Mailed Jul. 10, 2013, U.S. Appl. No. 12/152,546, filed May 14, 2008.
Non-Final Office Action, Mailed Jul. 18, 2013, U.S. Appl. No. 12/501,242, filed Jul. 10, 2009.
Final Office Action, Mailed Apr. 22, 2013, U.S. Appl. No. 12/965,725, filed Dec. 10, 2010.

* cited by examiner

| Document1_ID | Gaz1_ID | Score1_1 | Gazk_ID | Score1_k | ... |
|---|---|---|---|---|---|
| Document6_ID | Gaz5_ID | Score6_5 | | | |
| ... | | | | | |
| Documentz_ID | Gaz9_ID | Scorez_9 | Gazn_ID | Scorez_n | ... |

FIGURE 5A

| Document1_ID | Gaz1_ID | Gazk_ID | Score1_k + Score1_k |
|---|---|---|---|
| Document6_ID | Gaz5_ID | Score6_5 | |
| Documentz_ID | Gaz9_ID | Scorez_9 | |

FIGURE 5B

DYNAMICALLY LINKING RELEVANT DOCUMENTS TO REGIONS OF INTEREST

STATEMENT REGARDING FEDERALLY SPONSORED RESEARCH OR DEVELOPMENT

This invention was made with government support under DARPA Phase II STTR, Contract No. W31P4Q-09-C-0313, Title: Open Source Information Geospatial Overlay (OSIGO), awarded by the Defense Advanced Research Projects Agency (DARPA). The government has certain rights in the invention.

BACKGROUND OF THE INVENTION

The World Wide Web ("web") allows millions of people to engage in e-commerce, online social networking and other online services. Online advertising in digital documents has evolved with the growth of these online services. Digital advertisements are placed within digital documents provided to users over the web. The value of an online advertisement is commonly evaluated by a click count. Proper placement of a relevant advertisement is important to maximize the click count for that ad. Proper placement can involve placing an advertisement in a document such that the user viewing the document would be interested in the advertisement.

In addition to online advertisement placement, online document searching can be challenging when attempting to provide relevant documents to a user. Most document search services query a database of indexed documents using keywords provided by a user. Though some relevant documents can be included in the query results, many potentially relevant documents are not included within query results because of the database indexing mechanism, user's choice of keywords, or other reasons.

Successful document searching and advertisement placement within digital documents is important to providing a positive online experience for a user and for capitalizing on revenue opportunities.

SUMMARY OF THE INVENTION

The present technology determines document relevance to a geographical or other region of interest (ROI). A set of location references may be associated with a set of documents using techniques such as word matching. Location references associated with an ROI are selected. Documents corresponding to the selected location references are then selected. The selected documents can be reported or processed further. A document-location reference index can be accessed when the present system is 'online' and processing a request for documents relevant to an ROI. The document-location reference index may be generated and updated while the present system is 'offline' and not processing a request for documents. A location reference can include a record or set of data that describes a location or region. Documents can be selected based on relevance of the document to an ROI associated with an advertisement, a user or other subject.

An embodiment for relating documents to a region of interest links a plurality of location references stored in memory to a plurality of documents by a server. A sub-set of the plurality of location references associated with a region of interest may be selected. A subset of the plurality of documents may be selected which are associated with the sub-set of location references.

An embodiment includes a computer readable storage medium having a program which can be executed to link a plurality of location references to a plurality of documents, select a sub-set of the plurality of location references associated with a region of interest, and select a subset of the plurality of documents may which are associated with the sub-set of location references.

An embodiment includes a system having a query engine and a score generator configured to be executed by a processor. The query engine can be executed to query an index of linked documents and location references for documents linked to a subset of location references associated with a region of interest. The score generator can be executed to generate a score for each document, wherein each document score may be based on the location references linked to the document and associated with the region of interest.

BRIEF DESCRIPTION OF THE DRAWINGS

FIG. 5A illustrates an exemplary document-gazetteer index.

FIG. 5B illustrates an exemplary table of documents with aggregated location reference scores.

DESCRIPTION OF EXEMPLARY EMBODIMENTS

Figure 1:
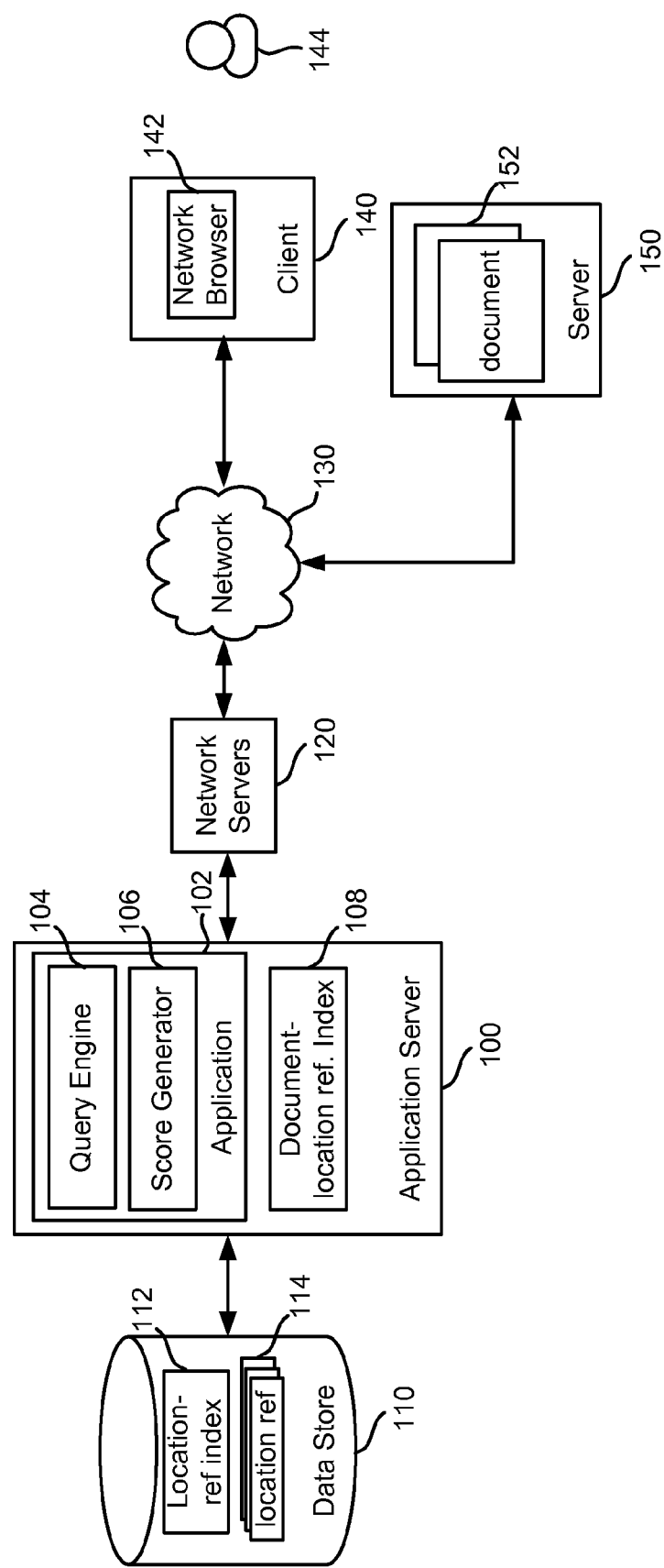
FIG. 1 is an exemplary block diagram of a system for relating documents to regions of interest.

The present technology determines document relevance to a region of interest. The system may perform some tasks in an "offline" mode and some tasks in an "online" mode. In some embodiments, during an online mode, a set of location references and a set of documents may be received and/or accessed by the system. The set of location references may be associated with the set of documents based on portion of the location references and documents that match, for example using techniques such as word matching. A region of interest may be received or accessed, thereby initiating the online mode. Location references associated with the received region of interest (for example, which corresponds to a location within the region of interest) may be selected. Documents corresponding to the selected location references may then be selected. The selected documents may be reported or processed further. Hence, documents and location references can be linked together when the present system is 'offline' and not currently processing a request for documents. The linked documents and location reference data can be accessed when the present system is 'online' and processing a request for documents relevant to a region of interest.

A location reference can include a record or set of data that describes a location or region. The location may be a geographical location or abstract location. An example of a location reference is a named gazetteer which describes a geographic location such as a city, street, address, neighborhood, a shape such as a circle or trapezoid that describes a geographical location on an image, or some other geographic location description.

A document includes digital content that can be displayed visually. Documents may include descriptions of a location, whether geographical or abstract. The descriptions may be in the form of text or graphics. For example, documents may include a web page, blog, SMS, MMS, article, or other form of digital content.

Determining document relevance to a region of interest may be performed in different phases. One or more documents may be linked to a set of location references as the documents or location references are received. The linking between a document and a location reference may be stored in an index. The index may be accessed when a request is received for documents that are relevant to a region of interest. Thus, the index can be accessed when the present system is 'online' and processing a request for documents relevant to a region of interest, and the index can be generated when the present system is 'offline' and not currently processing a request for documents.

The present system may have several applications. The present system may determine the relevance of content pages (e.g., web pages) to a region of interest associated with an advertisement. When the content pages relevant to the region of interest are identified, the advertisement can be placed within the content page. The present system may also determine the relevance of several documents to a region of interest associated with a user. The user may provide an ROI description, an extent of graphical image, or the location of a user can be determined, for example by the user's mobile device. Documents associated with the user's region of interest can then be determined and provided to the user.

FIG. 1 is an exemplary block diagram of a system for relating documents to regions of interest. The system of FIG. 1 includes application server 100, data store 110, and network server 120. Application server 100 may include an application 102 and one or more engines or modules executable by a processor to determine the relevance of documents to a region of interest. Application 102 may be implemented as one or more modules, applications or programs stored in memory and executed by one or more processors to perform the functionality and provide service features associated with the system discussed herein. Query engine 104 may query data stores, remote machines and other devices. Query engine 104 may also query location reference index 112 and document-location reference index 108. Score generator 106 may generate scores such as relevance scores based on a set of query results, aggregate scores and perform other operations.

Application server 100 may includes document-location reference index 108. Index 108 may include a record for each document. Each record may include fields for identifying a document, each location reference associated with the identified document and a relevance score for each location reference. The relevance score may be generated based on the relevance of the location reference to the identified document.

Application server 100 may include other modules and engines, executable by a processor, which may be used to perform the functionality discussed herein. Additionally, one or more modules discussed herein may be separated into more than one module or combined into a single module.

Application server 100 may communicate with data store 110. Data store 110 may include location references 114 and a location reference index 112. Location reference index 112 may include a number of records having fields for a location reference identifier and each word within the particular location reference.

Application server 100 may communicate with network 130 through one or more network servers 120. When network 130 is the Internet, network servers 120 may be implemented as one or more web servers. Network server 120 may receive requests over network 130 and process the requests and/or forward requests to application server 100. Network server 120 may provide responses to requests received over network 130. Network 130 is inclusive of any communication network such as the Internet, Wide Area Network (WAN), Local Area Network (LAN), intranet, extranet, private network, or other network.

Client 140 includes network browser 142 and may communicate with network 130. In some embodiments, user 144 may provide information to application server 100, such as region of interest data, document key word information, or other data through network browser 142. Network browser 142 may be executed by a processor to view a document, such as a content page or web page, provided by network server 120 over network 130. The documents may be provided in response to a user request for documents, and be geographically relevant to a user indicated region of interest. The documents may also include a geographically relevant advertisement within the documents.

Server 150 may include one or more documents 152 and communicate over network 130. Application server 100 may access documents 152 and create a document-location reference index 108. In some embodiments, region of interest data associated with an advertisement may also be received server 150 and provided to application server 100. For example, ROI information associated with one or more advertisements can be received by application server 100 from server 150

Figure 2:
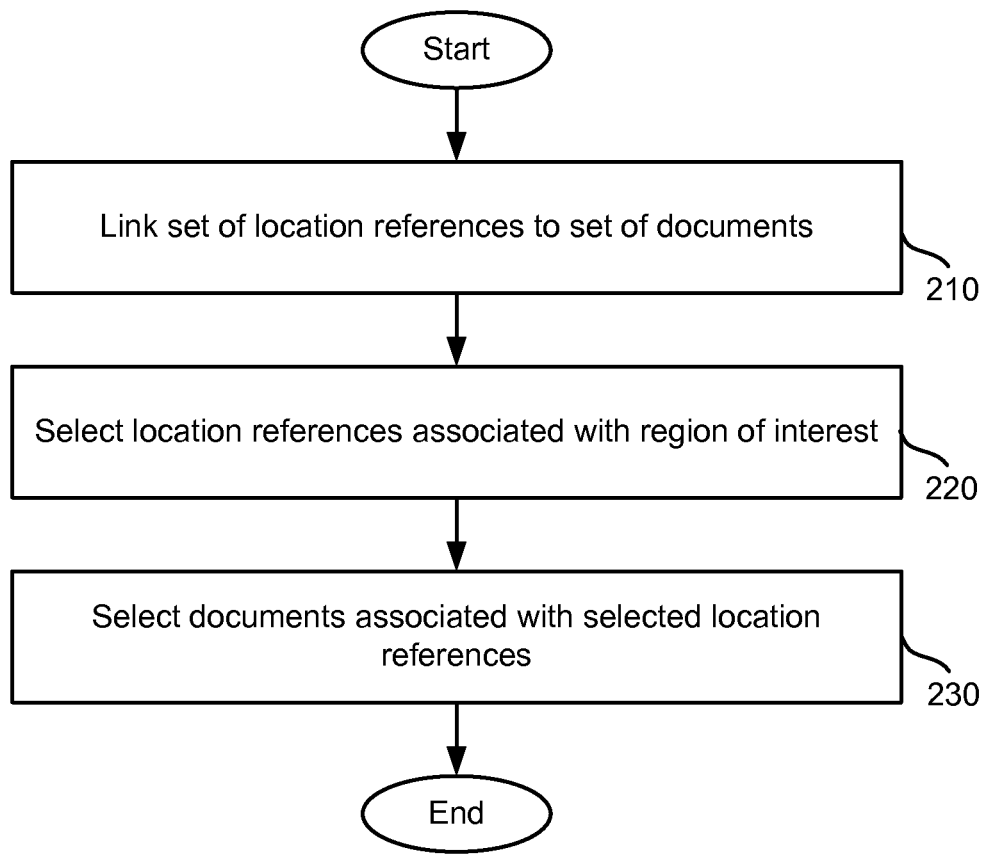
FIG. 2 is a flow chart of an exemplary method for relating documents to regions of interest.

FIG. 2 is a flow chart of an exemplary method for determining the relevance of documents to a region of interest. A set of location references is linked to a set of documents at step 210. The location references may be linked to the set of documents using word matching performed by application server 100. The linking of location references to documents may be stored in document-location reference index 108. The linking may be performed offline (e.g., when not processing a request for documents relevant to an ROI) to allow for more dynamic and quicker responses to requests for documents that are relevant to an ROI. Linking a set of location references to a set of documents is discussed in more detail below with respect to FIG. 3.

Location references are associated with a region of interest at step 220. The region of interest (ROI) may be received as user input in the form of a description, an extent, graphical input, or in some other form. The description may describe an address, neighborhood, city, or some other area, such as a geographical area. The extent may be any input which describes a geographical area, such as a circle or trapezoid, within an image. In some embodiments, the area identified by the ROI may also be an abstract area identified by a coordinate system or some other location identification system.

The ROI may be received as input other than user input, such as a data associated with one or more ads to potentially include or place within a document. Location references may be selected at step 220 which have position information which corresponds to a location within the ROI. For example, if the ROI is a city, a location reference of an address within that city would be selected as being associated with that ROI. In some embodiments, location references may be selected that are not within the ROI but are close to the ROI, for example if there are not location references determined to be within the ROI.

Documents associated with the selected location references are selected at step 230. After a location reference is selected at step 220, each document linked to that location reference (via step 210) is selected at step 230. Query engine 104 queries document-location reference index 108 for documents having scores for a selected location reference. Each document record having a score for at least one of the location references is returned by the query. For each document, the scores of the relevant location references can then be aggregated and filtered by value, number of documents, or some other metric, and further processed. Step 230 is discussed in more detail below with respect to FIG. 4.

Figure 3:
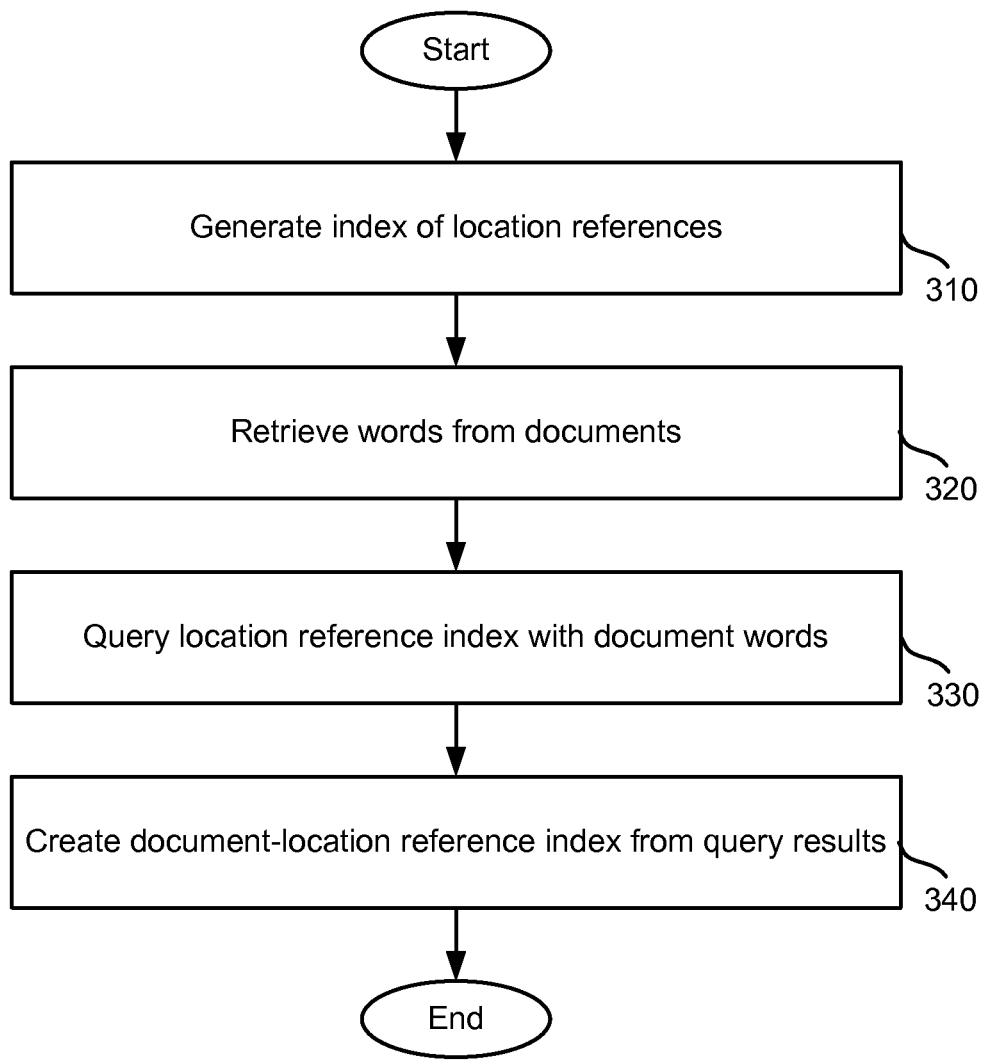
FIG. 3 is a flow chart of an exemplary method for linking location references to documents.

FIG. 3 is a flow chart of an exemplary method for linking location references to documents. In an embodiment, the method of FIG. 3 provides more detail for step 210 discussed above. An index of location references is generated at step 310. The index of location references includes location reference records created from the stored location references 114. Each record may include fields for a location reference identifier and words occurring in the location reference. Application 102 may generate the location reference index and store the index at data store 110, application server 100, or some other location.

Words are retrieved from one or more documents at step 320. The documents, such as a web page, blog, graphics, image, text, or other content, may be accessed and processed by application 102. In some embodiment, words included in an advertisement of a document are not retrieved and/or processed.

A location reference index is queried with document words at step 330. Each query may consist of a document word and returns the location reference that includes the word. A document-location reference index may be created from the query results at step 340. The index may consist of records associated with each document. Each record may include a field for a document identifier, a location reference identifier for each location reference linked to the document (e.g., includes a word that is found in the document) and a location reference relevance score for each linked location reference. Hence, if a particular document does not have any words that match a word within a location reference, there is no field for that location reference in that document record. The relevance scores may be determined in any of several ways such as by term frequency-inverse document frequency (TF-IDF). Document-location reference index 108 may be stored to application server 100, data store 110, or some other location. An example of a document-location reference index is illustrated in FIG. 5A.

The steps of FIG. 3 may be performed in any order and at any time. For example, the steps may be performed when application server 100 is not processing a document request. By performing the method of FIG. 3 offline when application server 100 is not processing document requests, the document-location reference index may be kept updated and available when an application server 100 receives a document request.

Figure 4:
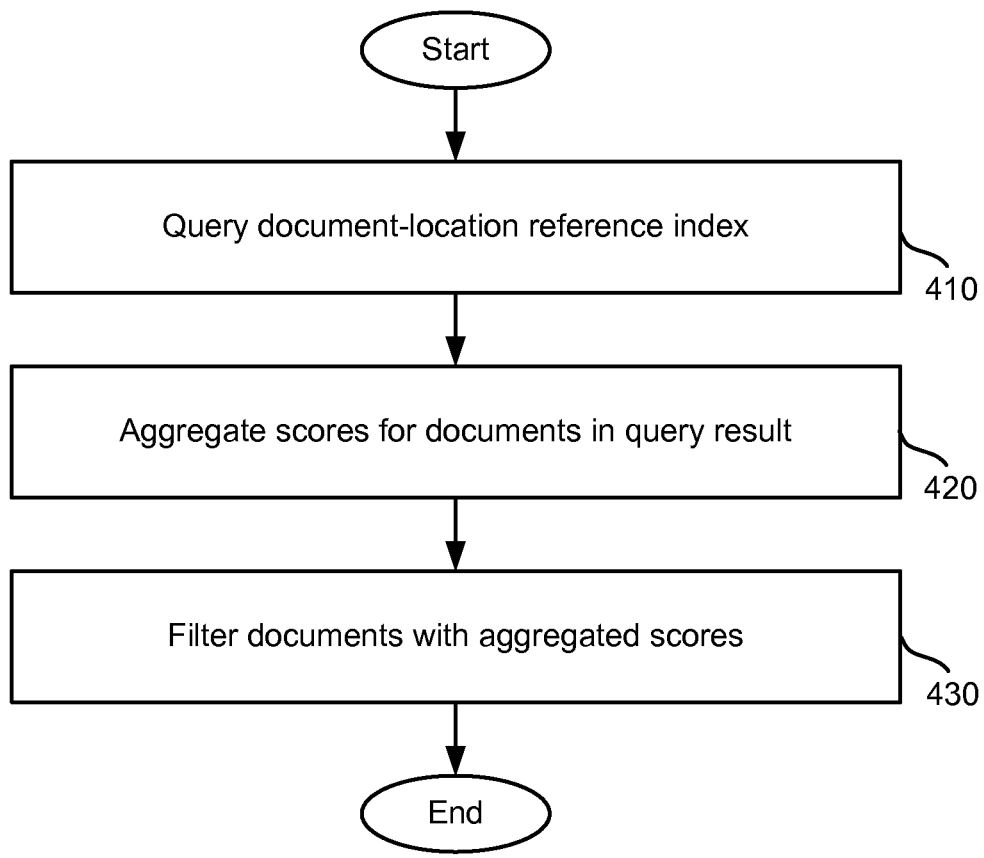
FIG. 4 is a flow chart of an exemplary method for selecting documents associated with location references.

FIG. 4 is a flow chart of an exemplary method for selecting documents associated with location references. In some embodiments, the method of FIG. 4 provides more detail for step 230 of the method of FIG. 2. The document-location reference index is queried at step 410. At step 220 in the method of FIG. 2, location references are selected which correspond to an ROI. The document-location reference index may be queried with each selected location reference, where each query returns document records selected having a relevance score for the location reference.

Scores are aggregated for documents in the query result at step 420. The list of documents from the query results of step 410 may be culled to remove duplicates. For each document that has at least one relevance score for the selected location references, the scores within a document for each selected location reference are aggregated for the document. Hence, although a document record may have at least one selected location reference associated with an ROI, not necessarily every location reference is a selected location reference (selected at step 220) and used in the aggregation of location reference scores. An example of a list of aggregated scores for document records returned by a query of the document-location reference is illustrated in FIG. 5B.

Documents can be filtered by their aggregated scores at step 430. The documents may be filtered by aggregated relevance, maximum document number, a combination of these, and/or other factors. For example, after scores are aggregated for the documents, the top ten documents with an aggregated score of above 0.7 may be selected to receive an advertisement or as being most relevant to a particular ROI.

In some embodiments, in addition to using an ROI to determine document relevance, the present system may determine document relevance using key words. In this embodiment, relevance scores can be determined for each document based on the occurrence of key words in the document. Records for each document may be created which include relevance scores for each key word. For each document, the scores of the key words could be aggregated, similar to step 420. Documents may be filtered based on both ROI relevance and keyword relevance.

Determining the relevance of a document based on an ROI may have several applications. The ROI may be associated with an advertisement to provide in a document. A provider of the advertisement may specify the ROI in which the advertisement is relevant. For example, an advertisement may be associated with a happy hour at a restaurant within a city. The ROI may specify the city and street of the advertisement. Documents linked to location references which match the city or street of the ROI may be selected as potential documents to include the advertisement. Hence, an online article about a movie theater located in the same city and street (i.e., linked to a location reference with the same city and street) as the ROI could be relevant to the article based on the geographical location.

Relevance of documents may also be based on an ROI provided by a user. A user may provide ROI information by a description of the ROI, selecting an ROI as an extent on a geographical image, or in some other format. Documents relevant to the ROI provided by the user may be returned to the user. The documents may be provided in a list, associated with icons of the geographical image, or provided in some other manner.

FIG. 5A illustrates a portion of an exemplary document-location reference index. The first row of the index is associated with a Document1_ID and includes fields with representative values of Gaz1_ID, Score1_1, GazK_ID, and Score1_K. Gaz1_ID and GazK_ID are identifiers for two different location references (for example, gazetteers) which have words that match one or more words in document identified as Document1_ID. The Score1_1 and Score1_K are relevance values for Gaz1_ID and GazK_ID, respectfully. The second row in the document-location reference index indicates that a document with an identifier of Document6_ID is linked to a location reference with an identifier of GazK_ID, wherein the location reference has a relevance score represented of Score6_5. The last row in the document-location reference index indicates that a document with an identifier of Documentz_ID is linked to a location references with identifiers of GazK_ID and Gazn_ID, the location references having relevance scores of Scorez_9 and Scorez_n, respectively.

FIG. 5B illustrates an exemplary table of documents with aggregated location reference scores. The document identifiers associated with the three rows in the table of FIG. 5B are similar to the three documents listed in the index of FIG. 5A. For each document identifier, the location references associated with a region of interest are listed. Each location reference in the index of FIG. 5A is included in the ROI except Gazn_ID. Hence, the aggregated location reference relevance scores consist of scores for location references Gaz1_ID and Gazk_ID for Document1_ID, location reference Gazn_ID for Document6_ID and location reference Gaz9_ID for Documentz_ID.

Figure 6:
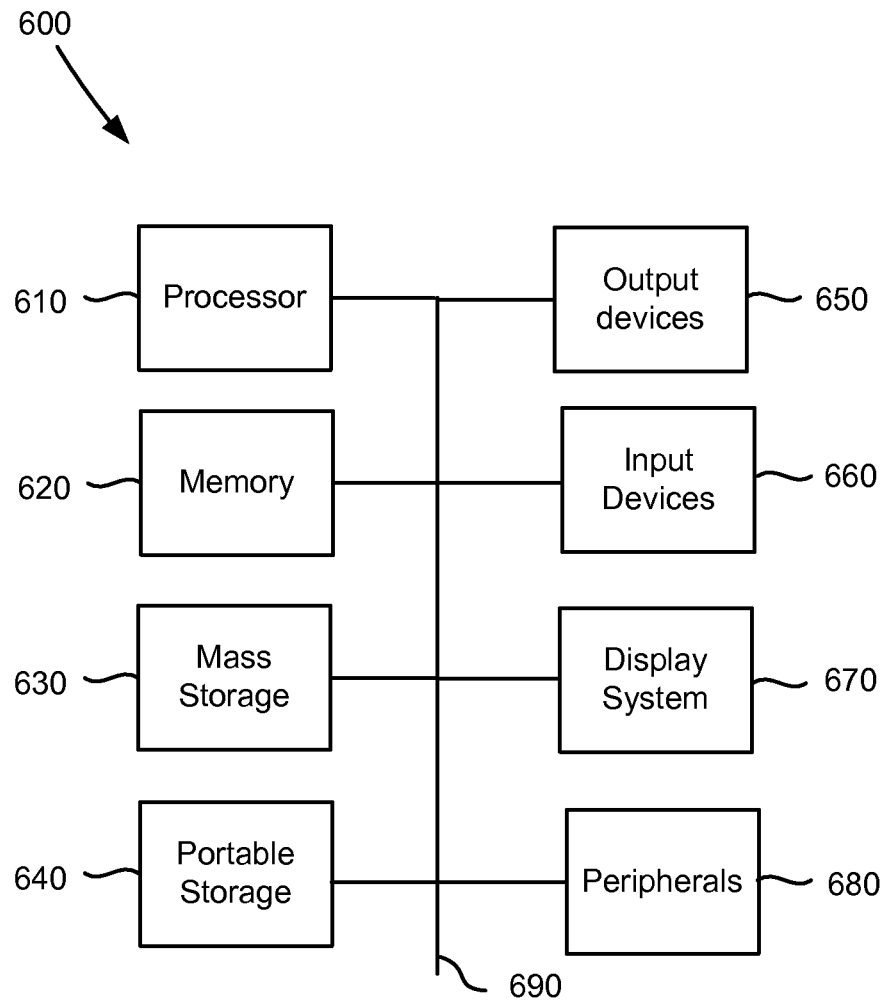
FIG. 6 is an exemplary computing system that may be used to implement an embodiment of the present technology.

FIG. 6 illustrates an exemplary computing system 600 that may be used to implement an embodiment of the present technology. FIG. 6 is an exemplary computing system that may be used to implement an embodiment of the present technology. The system of FIG. 6 may be used to implement application server 100, data store 110, network server 120, client 140 and server 150. The computing system 600 includes one or more processors 610 and main memory 620. Main memory 620 stores, in part, instructions and data for execution by processor 610. Main memory 620 can store the executable code when in operation. The computing system 600 further includes a mass storage device 630, portable storage medium drive(s) 640, output devices 650, user input devices 660, a graphics display 670, and peripheral device(s) 680.

The components shown in FIG. 6 are depicted as being connected via a single bus 690. The components may be connected through one or more data transport means. The processor 610 and the main memory 620 may be connected via a local microprocessor bus, and the mass storage device 630, the peripheral devices 680, the portable storage medium drive(s) 640, and display system 670 may be connected via one or more input/output (I/O) buses.

The mass storage device 630, which may be implemented with a magnetic disk drive or an optical disk drive, is a non-volatile storage device for storing data and instructions for use by the processor 610. The mass storage device 630 can store the system software for implementing embodiments of the present invention for purposes of loading that software into the main memory 620.

The portable storage device 640 operates in conjunction with a portable non-volatile storage medium, such as a floppy disk, compact disk, digital video disc, or USB storage device, to input and output data and code to and from the computer system 600 of FIG. 6. The system software for implementing embodiments of the present invention may be stored on such a portable medium and input to the computer system 600 via the portable storage device 640.

The input devices 660 provide a portion of a user interface. The input devices 660 may include an alpha-numeric keypad, such as a keyboard, for inputting alpha-numeric and other information, or a pointing device, such as a mouse, a trackball, stylus, or cursor direction keys. Additionally, the computing system 600 as shown in FIG. 6 includes the output devices 650. Suitable output devices include speakers, printers, network interfaces, and monitors.

The display system 670 may include a liquid crystal display (LCD) or other suitable display device. The display system 670 receives textual and graphical information, and processes the information for output to the display device.

The peripheral device(s) 680 may include any type of computer support device to add additional functionality to the computer system. The peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, webOS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for relating documents to a region of interest, the method comprising:

linking a plurality of location references stored in memory to a plurality of documents by a server, the linking including:

creating a location reference index which includes a location reference identifier for each location reference and a list of words within each location reference, querying the location reference index using words retrieved from one or more of the plurality of documents, and creating a document-location reference index using results from the query of the location reference index, records associated with each document of the document-location reference index including a document identifier, one or more location reference identifiers linked to the document, and a score for each location reference identifier linked to the document; and processing a document request after the linking, the processing including:
selecting a sub-set of the plurality of location references associated with a region of interest,
querying the document-location reference index using each of the location references of the selected sub-set of location references and the score for the each of location references, and
selecting a subset of the plurality of documents associated with the sub-set of location references using results of the query of the document-location reference index.

2. The method of claim 1, wherein querying the document-location reference index further comprises:
removing duplicate documents; and
for each document in the query result, aggregating one or more of the scores for location reference identifiers linked to the document, and filtering documents using the aggregated scores.

3. The method of claim 1, wherein querying the location reference index is performed while linking a plurality of location references stored in memory to a plurality of documents by a server is not being performed.

4. The method of claim 1, wherein each record of the document-location reference index includes score for each location reference identifier having a word found in the document associated with the record.

5. The method of claim 1, wherein the region of interest is received as text input.

6. The method of claim 1, wherein the region of interest is received as a selected portion of an image.

7. The method of claim 1, wherein the region of interest is a geographical region.

8. The method of claim 1, wherein the selected location references have geographical positioning data corresponding to a position within the region of interest.

9. The method of claim 1, further comprising determining a score for each document associated with a location reference within the region of interest.

10. The method of claim 9, wherein linking a plurality of location references stored in memory to a plurality of documents is performed offline and further comprises:
generating a score for each location reference for each document; and
for each document, aggregating the location reference scores for location references associated with the region of interest.

11. The method of claim 10, further comprising filtering the sub-set of the plurality of documents by the aggregated location reference scores.

12. The method of claim 10, further comprising selecting documents to receive an advertisement based on the aggregated location reference scores, the region of interest associated with the advertisement.

13. The method of claim 10, wherein processing a document request after the linking further comprises selecting documents to provide to a user based on the aggregated location reference scores, the region of interest associated with the user.

14. The method of claim 10, wherein processing a document request further comprises selecting documents to provide to a user based on an aggregated score for keyword scores associated with a user and the aggregated location reference scores, the region of interest associated with the user.

15. The method of claim 1, wherein the score for each location reference identifier is determined using frequency-inverse document frequency.

16. A non-transitory computer readable storage medium having a program embodied thereon, the program executable by processor to perform a method for relating documents to a region of interest, the method comprising:
linking a plurality of location references to a plurality of documents;
creating an index having a record for each document in the plurality of documents, each document record including a score for each location reference having a word found in the document associated with the record;
selecting a sub-set of the plurality of location references associated with a region of interest; and
selecting a subset of the plurality of documents associated with the sub-set of the plurality of location references.

17. The computer readable storage medium of claim 16, wherein the region of interest is a geographical region.

18. The computer readable storage medium of claim 16, wherein the selected location references have geographical positioning data corresponding to a position within the region of interest.

19. The computer readable storage medium of claim 16, wherein the method further comprises:
determining a score for each document associated with a location reference within the region of interest; and
determining relevance scores for each document based on keywords in the document.

20. The computer readable storage medium of claim 19, wherein the method further comprises:
generating a score for each location reference for each document; and
for each document, aggregating the location reference scores for location references associated with the region of interest and aggregating the relevance scores of the keywords.

21. The computer readable storage medium of claim 19, wherein the method further comprises selecting documents to receive an advertisement based on the aggregated location reference scores, the region of interest associated with the advertisement.

22. The computer readable storage medium of claim 19, wherein the method further comprises selecting documents to provide to a user based on the aggregated location reference scores, the region of interest associated with the user.

23. A system for relating documents to regions of interest, comprising:
a query engine stored in memory and executable by a processor to query an index of linked documents and location references for documents linked to a subset of location references associated with a region of interest; and
a score generator stored in memory and executable by a processor to generate a score for each document, each document score based on the location references linked to the document and associated with the region of interest.

* * * * *

UNITED STATES PATENT AND TRADEMARK OFFICE
CERTIFICATE OF CORRECTION

PATENT NO. : 8,635,228 B2
APPLICATION NO. : 12/619554
DATED : January 21, 2014
INVENTOR(S) : Cyrus Shahabi et al.

It is certified that error appears in the above-identified patent and that said Letters Patent is hereby corrected as shown below:

In the Specification:

At column 3, line 44, delete the word "includes" and insert the word --include--

In the Claims:

At column 9, line 7, delete the text "for the each of" and insert the text --for each of the--

At column 9, line 9, delete the text "selecting a subset" and insert the text --selecting a sub-set--

At column 10, line 1, delete the text "a user" and insert the text --the user--

At column 10, line 19, delete the text "selecting a subset" and insert the text --selecting a sub-set--

At column 10, line 54, delete the text "a subset" and insert the text --a sub-set--

At column 10, line 57, delete the text "by a" and insert the text --by the--

Signed and Sealed this
Seventh Day of October, 2014

Michelle K. Lee
*Deputy Director of the United States Patent and Trademark Office*